United States Patent [19]
Pignata et al.

[11] 3,949,360
[45] Apr. 6, 1976

[54] OIL LEVEL DETECTOR AND INDICATOR

[76] Inventors: Richard Pignata, 63 Peter Ave., Staten Island, N.Y. 10306; Salvadore Martocci, 275 Brich St., Emerson, N.J. 07630

[22] Filed: July 23, 1974

[21] Appl. No.: 491,469

[52] U.S. Cl. ............... 340/59; 137/558; 200/84 C; 340/244 A
[51] Int. Cl.[2] ................ G08B 21/00; H01H 36/02
[58] Field of Search ...... 340/59, 244 A, 244 E, 349; 200/84 C; 73/224, 307, 308, 313; 137/386, 558

[56] References Cited
UNITED STATES PATENTS
2,671,893  3/1954  Van Scoy et al. ............. 340/239 R
2,747,042  5/1956  Zimmerman .................... 200/81.9

Primary Examiner—John W. Caldwell
Assistant Examiner—Joseph E. Nowicki

[57] ABSTRACT

In order to sense the level of oil in a tank coupled through a line to an engine, and to give a warning when the level is low, a detector is provided which includes a pipe section interposed in the line and passing through a chamber. Openings in the pipe section cause the oil to leak into the chamber to form a pool therein. Resting on the pool and rising and falling therewith is a float having a magnet therein. When the oil level is low, the magnet is brought into the proximity of a reed switch at the bottom of the chamber, the switch then being actuated to close an alarm circuit.

6 Claims, 3 Drawing Figures

U.S. Patent  April 6, 1976  3,949,360
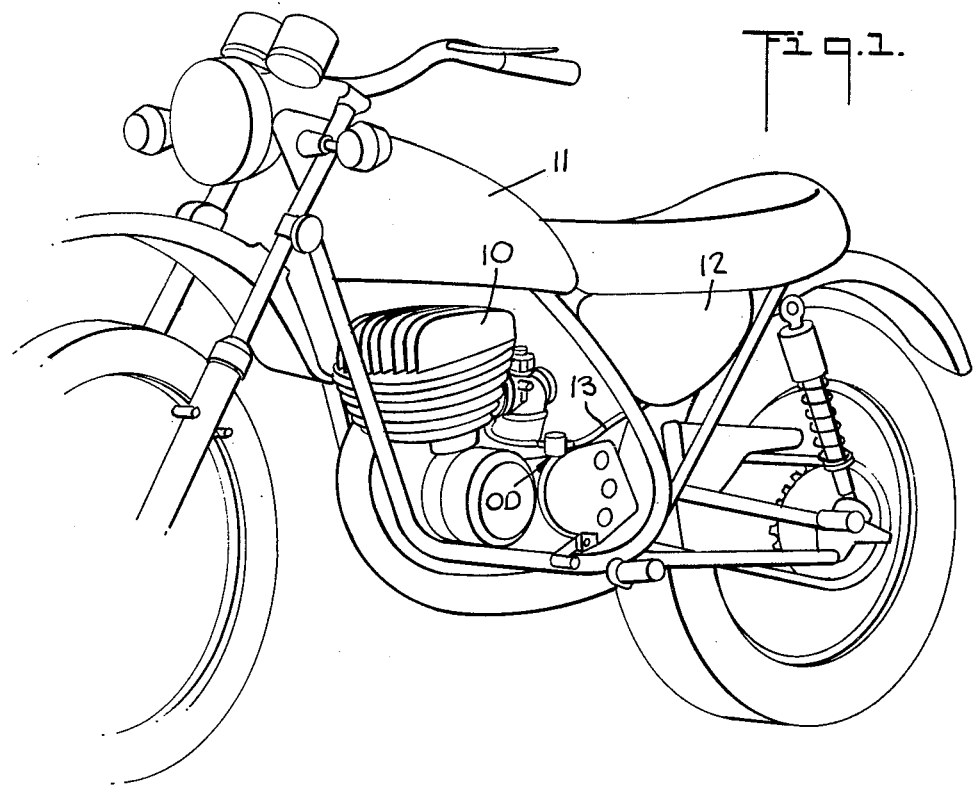
Fig.1.
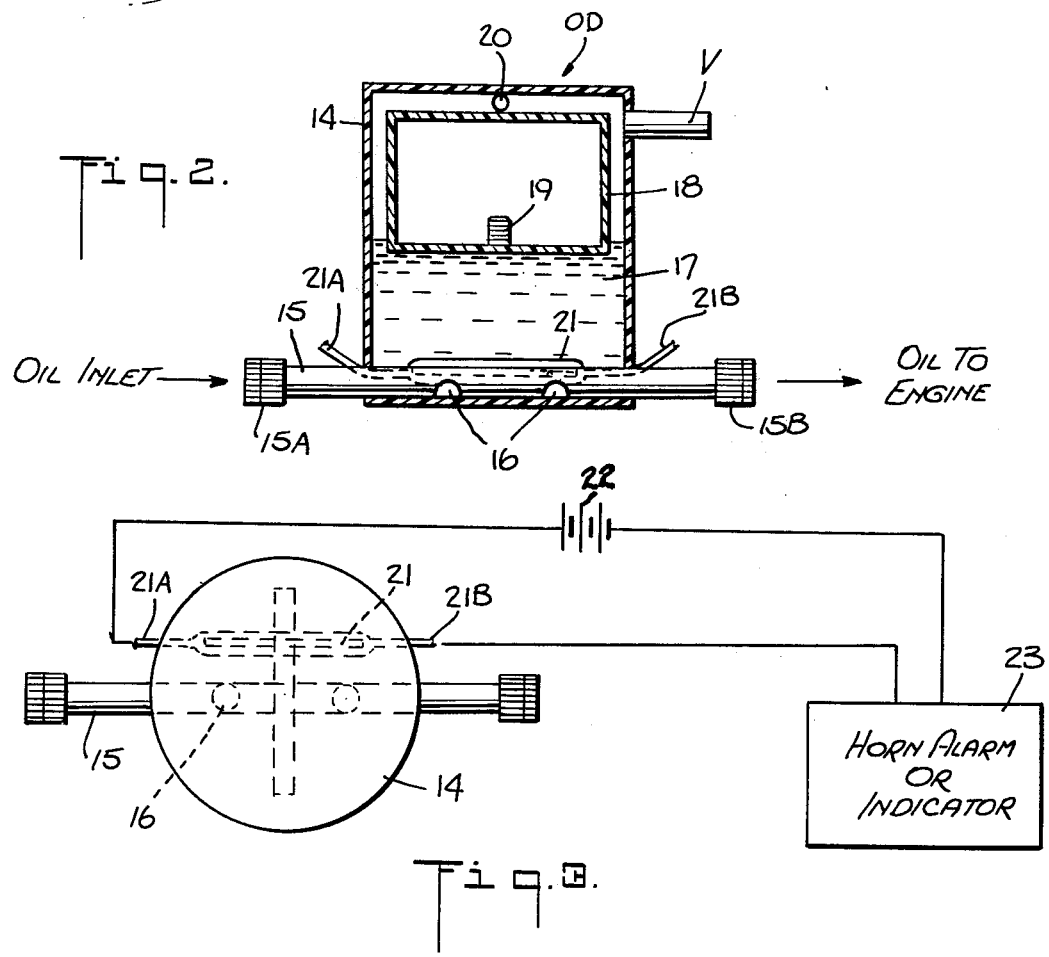
Fig.2.
Fig.3.

OIL LEVEL DETECTOR AND INDICATOR

BACKGROUND OF THE INVENTION

This invention relates generally to oil injection systems for two-stroke internal combustion engines, and more particularly to an oil detector adapted to set off an alarm should the oil supply fall below a safe operating level.

The two-stroke internal combustion engine undergoes two piston strokes or only one revolution for each cycle of operation. Exhaust ports in the cylinder wall are uncovered by the piston near the end of the expansion stroke to permit the escape of exhaust gases and reduce the pressure in the cylinder. The fuel charge flows into and is compressed in a separate crankcase compartment. Intake ports are uncovered by the piston soon after the opening of the exhaust, and the compressed charge flows into the cylinder, expelling most of the exhaust products.

In a crankcase-scavenged, two-stroke engine, the crankcase is hermetically sealed so that it can function as a pump in conjunction with the piston. In less expensive forms of crankcase-scavenged engines, the lubricating oil is mixed with the gasoline. The ratio of oil to gasoline in the mixture is determined by taking into account the oil requirements of the engine at maximum operating speed.

The difficulty with using a predetermined oil-to-gas ratio is that at low and medium operating speeds, the relative amount of oil is in excess of engine requirements, as a consequence of which oil is wasted and harmful deposits build up in the exhaust pipe, the muffler and in the combustion chamber. These deposits usually give rise to pre-ignition and a decrease in compression as well as irregular combustion and poor cooling efficiency.

To obviate this difficulty, it is now the practice in some two-stroke engines, as for example in motorcycles, such as the Suzuki TS-400L and the Kawasaki H-2 750, to segregate the gasoline supply from the oil supply. In such arrangements, oil from the oiltank is gravity fed through an oil line to an oil pump which functions to inject the oil into the crankcase under pressure. The ratio of oil to gasoline is automatically adjusted as a function of the throttle opening so that this ratio varies in accordance with engine speed and the amount of oil is never in excess of engine requirements. As a consequence, engine performance is markedly improved.

In a two-stroke engine in which the oil is pre-mixed with the gasoline, should the fuel mixture become exhausted, the engine will merely cease to function, but the engine will in no way be damaged by the absence of the mixture. However, in an engine in which the oil is separately injected, when oil is depleted, the engine continues to be supplied with gasoline and keeps running. As a consequence, the piston may seize and the engine structure may be otherwise impaired due to the dearth of lubrication. On existing types of two-stroke engines, no means are provided to indicate the depletion of oil.

SUMMARY OF THE INVENTION

In view of the foregoing, it is the main object of this invention to provide a detector which is interposable in an oil line extending from an oil tank to an engine or other utilization device, the detector being adapted to sense the level of oil in the tank and to produce a switching action when the level is dangerously low to activate an alarm.

More particularly, it is an object of this invention to provide a highly compact, efficient and reliable oil detector which may be readily installed on an existing motorcycle or other device utilizing a two-stroke engine.

Still another object of the invention is to provide a detector of simple and inexpensive design which may be mass produced at low cost.

Briefly stated, these objects are attained in a detector having a pipe section passing through the bottom portion of a chamber and having openings therein whereby when the section is interposed in an oil supply line, the oil leaks into the chamber to create an oil pool therein which rises when the supply is high and falls when the supply is low. Resting on the pool is a float having a magnet therein, which magnet, when the pool is low, is brought into the proximity of a magnetically-actuatable switch to activate the switch and close an alarm circuit.

OUTLINE OF THE DRAWING

For a better understanding of the invention as well as other objects and features thereof, reference is made to the following detailed description to be read in conjunction with the annexed drawings wherein:

FIG. 1 is a perspective view of a motorcycle which includes an oil level detector in accordance with the invention;

FIG. 2 is a sectional view of the detector; and

FIG. 3 is a plan view thereof.

DESCRIPTION OF THE INVENTION

Referring now to FIG. 1, there is shown a motorcycle having a two-stroke internal combustion engine 10. The engine is supplied with gasoline from a gas tank 11 and is supplied with lubricating oil stored in a separate tank 12.

Interposed in a gravity flow line 13 leading from oil tank 12 to the oil injection pump which forces the oil into the crankcase of the engine, is an oil detector in accordance with the invention, generally designated as OD. Detector OD includes an electrical switch which is actuated only when oil in the line approaches exhaustion, the actuated switch operating an alarm or indicator to call attention to this condition so that the driver is admonished to stop the engine and refill the oil tank without delay, thereby avoiding damage to the engine.

Detector OD, shown separately in FIGS 2 and 3, is constituted by a cylindrical chamber 14 having a pipe section 15 passing horizontally therethrough at a position adjacent the bottom of the chamber. The ends of pipe section 15 which are outside of the chamber are provided with inlet and outlet line couplers 15A and 15B to facilitate interposition of the detector in oil line 13. Section 15 has apertures 16 therein which cause oil passing through the section to leak into chamber 14 and to form an oil pool 17 therein. Extending laterally from the upper end of chamber 14 is vent tube V to permit displacement of air from the chamber as the pool rises therein.

Disposed within the chamber is a hollow float member 18 within which is held a permanent magnet bar 19, the bar being freely disposed in and lying on the base of the float. Float 18 rests on the oil pool and rises and falls therewith, the maximum rise being limited by a stop 20 secured to the top wall of the chamber to maintain an air space between the upper end of the float and the top wall and thereby prevent blockage of the air vent. The chamber is preferably formed of transparent synthetic plastic material of high impact strength to expose the oil pool.

The float is unrestrained so that it is free to rotate as well as to rise and fall with the level of oil in the chamber. This lack of restraint is useful in that it prevents the float from sticking within the chamber. And because the bar magnet is freely disposed within the float, when in proximity to the reed switch at the bottom of the chamber it will orient itself into alignment with the switch regardless of the angular position of the float.

Placed within chamber 14 and secured to the bottom thereof is a magnetically-actuatable sealed reed switch 21 whose leads 21A and 21B extend out of the chamber and are connected in series with a battery or other voltage source 22 and an alarm or indicator 23. In practice, the alarm may be the horn already installed on the motorcycle and the voltage source, the existing battery serving to energize the horn. Because a motorcycle is a relatively noisy vehicle, it is important that the alarm be heard over motor noise, for the depletion of oil is serious and requires immediate attention.

When therefore the oil supply is adequate, the oil passing through line 13 into the engine through detector OD leaks into the detector chamber to form an oil pool therein to raise float 18 to its upper level, thereby withdrawing magnet 19 from the proximity of reed switch 21. But when the oil begins to run low, the level of the pool drops to a point at which magnet 19 is sufficiently close to switch 21 to actuate the switch and sound the alarm.

Since it is vital that the driver be warned before the oil is entirely depleted, the arrangement is such that the switch is actuated when the supply is approaching depletion. While the invention has been described in connection with a two-stroke engine on a motorcycle, it will be obvious that the same detector may be used in any oil line where it is necessary to give a warning should the oil supply run low. It will also be appreciated that many changes and modifications may be made in the oil detector without departing from the essential spirit of the invention as disclosed therein.

I claim:

1. An apparatus to indicate the level of oil in a supply tank which is coupled through a gravity feed line to a motor, said apparatus comprising:
    A. a detector disposed at a level below that of said supply tank and provided with a cylindrical chamber having a pipe section extending horizontally therethrough and adapted to be interposed in said line, said section being disposed adjacent a bottom wall of said chamber and having openings whereby oil leaking into said chamber creates an oil pool therein, said chamber having an air vent at the upper end thereof, a float disposed in said chamber and rising and falling with said pool, said chamber having a stop at a top wall thereof to maintain an air space between the upper end of said float and said top wall to prevent blocking said air vent, said float incorporating a permanent magnet, and a magnetically-actuatable reed switch disposed at the bottom of said chamber and actuated only when the float magnet is in proximity thereto as a result of a low oil level condition; and
    B. means connected to said switch to indicate said condition.

2. Apparatus as set forth in claim 1, wherein said motor is a two-stroke internal combustion engine having a gasoline tank as well as said oil supply tank and an oil injection pump, and said line feeds oil from said oil tank into the oil injection pump of said engine, said indication being in the form of an alarm that can be heard above the noise of said motor.

3. Apparatus as set forth in claim 1, wherein said chamber is formed of transparent material to expose said oil pool.

4. Apparatus as set forth in claim 1, wherein said pipe section is provided with inlet and outlet line couplers to facilitate the interposition thereof in said line.

5. Apparatus as set forth in claim 1, wherein said motor is incorporated in a motorcycle that includes a horn and a battery, and said horn serves as a low-level oil indicator by connecting said horn to said battery in series with said detector switch.

6. Apparatus as set forth in claim 1, wherein said float is unrestrained and is free to rotate as well as to rise and fall, and wherein said magnet is a bar magnet which is freely disposed in and lies on the base of the float whereby said magnet when in the proximity of the switch orients itself into alignment therewith.

\* \* \* \* \*